US006552268B2

(12) United States Patent
Daoud et al.

(10) Patent No.: US 6,552,268 B2
(45) Date of Patent: Apr. 22, 2003

(54) INSULATION DISPLACEMENT CONNECTOR WITH A WIRE EJECTION FEATURE

(75) Inventors: Bassel Hage Daoud, Parsippany, NJ (US); Ivan Pawlenko, Holland, PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/891,629

(22) Filed: Jun. 25, 2001

(65) Prior Publication Data

US 2002/0195264 A1 Dec. 26, 2002

(51) Int. Cl.$^{7}$ .................................................. H02G 3/18

(52) U.S. Cl. .......................... 174/59; 174/59; 439/402; 439/403; 439/404; 439/409; 439/419; 439/421

(58) Field of Search ........................... 174/59; 439/402, 439/409, 219, 404, 482, 403, 395, 521, 676

(56) References Cited

U.S. PATENT DOCUMENTS

| | | | | |
|---|---|---|---|---|
| 5,989,054 A | * 11/1999 | Fasce | ......................... | 439/358 |
| 5,993,264 A | * 11/1999 | Daoud | ......................... | 439/557 |
| 6,000,962 A | * 12/1999 | Daoud | ......................... | 439/395 |
| 6,077,112 A | * 6/2000 | Daoud et al. | ............... | 439/206 |

* cited by examiner

*Primary Examiner*—Dean A. Reichard
*Assistant Examiner*—Anton Harris

(57) ABSTRACT

An insulation displacement connector (IDC) having a body and a cap pivotably connected thereto. A wire channel is defined through the pivotable cap and has an insertion opening and an exit opening that provide separate ingress and egress openings for the wire channel. An insulated wire may be inserted into the wire channel via the insertion opening, and may exit the wire channel via the exit opening. Similarly, any insulation separated from the wire during use of the IDC is not trapped in the wire channel, but may easily be cleared therefrom via either the insertion or exit opening.

18 Claims, 5 Drawing Sheets

INSULATION DISPLACEMENT CONNECTOR WITH A WIRE EJECTION FEATURE

BACKGROUND OF THE INVENTION

1. Field of the Invention

The present invention is directed to an insulation displacement connector with a wire ejection feature.

2. Background of the Invention

An insulation displacement connector (IDC) typically has a wire channel for receiving an insulated wire. The wire channel typically has an insertion opening or port at one end, and is closed at the other end. A wire may thus be inserted in the opening, but will not extend or protrude out of the wire channel. Once the wire is inserted in the wire channel, a movable part of the IDC may be caused to move to bring the wire in contact with a terminal that cuts through the insulation of the wire and establishes a connection to the conductor of the wire. The insulation from the wire may break off or be separated from the conductor, and may become lodged in the wire channel. Before a new wire may be inserted in the wire channel, the loose insulation must be removed. One solution to that problem is to insert a thin probe into the wire channel to extract the loose insulation. However, the small size of the wire channel makes that task difficult because the probe cannot be easily maneuvered within the wire channel. It is also not practical to shake the IDC because it is usually mounted to or provided as part of some other structure.

It is thus desirable to provide an insulation displacement connector that overcomes the above-described shortcomings of the prior art.

SUMMARY OF THE INVENTION

The present invention is directed to an insulation displacement connector (IDC) having a body and a cap pivotably connected thereto. A wire channel is defined through the pivotable cap and has an insertion opening and an exit opening that provide separate ingress and egress openings for the wire channel. An insulated wire may be inserted into the wire channel via the insertion opening, and may exit the wire channel via the exit opening. Similarly, any insulation separated from the wire during use of the IDC is not trapped in the wire channel, but may easily be cleared therefrom via either the insertion or exit opening.

When a wire is placed in the wire channel, the pivotable cap may be caused to pivot into releasable locking engagement with the body. A terminal provided as part of the IDC cuts through the insulation and makes physical contact with the conductor of the wire. Any insulation that may separate from the wire may be removed from the wire channel via either of the insertion opening or exit opening.

The present invention also facilitates "daisy-chaining" a plurality of connectors together. A single wire may be routed through the wire channel of a first IDC, and may exit via the exit opening of that wire channel and pass to a wire channel of a second IDC. In that manner, a plurality of IDCs may be connected together.

The IDC of the present invention may be provided as part of customer bridge, as part of an interconnection patch panel or terminal block, or in other devices, equipment, and structures, as is generally known in the art. It will be obvious to persons skilled in the art and from the disclosure provided herein that the present invention is not limited or otherwise defined by the application for which the IDC is used. Any application for which an IDC is suited may utilize the IDC of the present invention and benefit from its advantages.

Other objects and features of the present invention will become apparent from the following detailed description, considered in conjunction with the accompanying drawing figures. It is to be understood, however, that the drawings, which are not to scale, are designed solely for the purpose of illustration and not as a definition of the limits of the invention, for which reference should be made to the appended claims.

BRIEF DESCRIPTION OF THE DRAWINGS

In the drawing figures, which are not to scale, and which are merely illustrative, and wherein like reference numerals depict like elements throughout the several views.

DETAILED DESCRIPTION OF THE PREFERRED EMBODIMENTS

Figure 1:
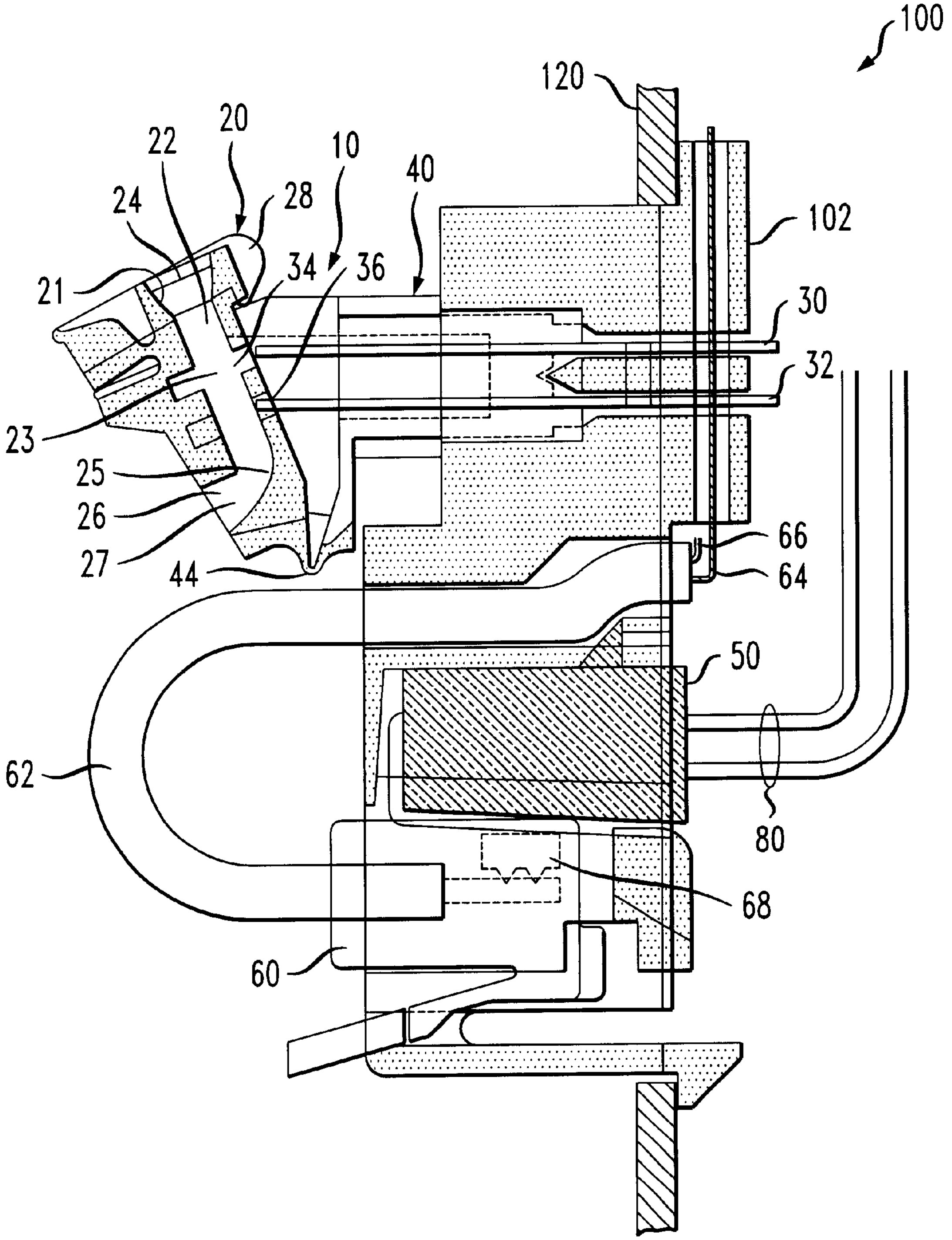
FIG. 1 is a partial cross-sectional side view of an insulation displacement connector constructed in accordance with an embodiment of the present invention and provided in a customer bridge.

Referring now to the drawings in detail, the various embodiments of the present invention will now be discussed. With reference first to FIG. 1, an insulation displacement connector (IDC) constructed in accordance with an embodiment of the present invention is there depicted and is generally designated by reference numeral 10. The IDC 10 may be fixedly or removably held in place in a customer bridge 100, or other device or structure, as a routine matter of design choice. The customer bridge 100 includes a body 102 having a first connector 50 for receiving a telephone line wire pair 80 (e.g., typically a tip-ring pair) that is coupled to a central office, PBX or other communication device or system (not shown). In an exemplary embodiment, first connector 50 is a 645 type plug connector, or other art-recognized connector.

A second connector 60 is also provided as part of the customer bridge 100. In the embodiment depicted in FIG. 1, second connector 60 is selectively removable from the customer bridge 100, and includes a plurality of terminals 68 (one being shown in FIG. 1), each of which contacts a corresponding terminal (not shown) in first connector 50. Electrical connection may thus be established between telephone line wire pair 80 and a multi-conductor cable 62 connected to second connector 60. Two conductors 64, 66 provided as part of cable 62 are routed through the body 102 of customer bridge 100, and each contactingly engage a separate terminal 30, 32 of the IDC 10. Electrical connection from the telephone wire pair 80 to the terminals 30, 32 of the IDC 10 may thus be established. An electronic device (e.g., data communication, voice communication, etc.) may be connected to the IDC 10 and, via the various interconnections provided by the customer bridge 100, to a central office, PBX or other communication device or system.

The IDC 10 of the present invention will now be discussed in detail and with continued reference to FIG. 1. The IDC 10 comprises a body 40 and a cap 20 pivotably connected thereto via a living hinge 44. Two terminals 30, 32 extend through the body 40 and are held securely therein. Each conductor 30, 32 is positioned in the body 40 with respect to the cap 20 so that a transverse channel 34, 36 defined in the cap 20, passes freely over and about each terminal 30, 32 when the cap 20 is pivotably moved. The terminals 30, 32 include a cutting feature that cuts through the insulation of a wire and a connecting feature that establishes a physical connection between the terminal and the conductor of the wire. Such cutting and connecting features are generally known in the art and need not be described in detail herein.

Figure 3:
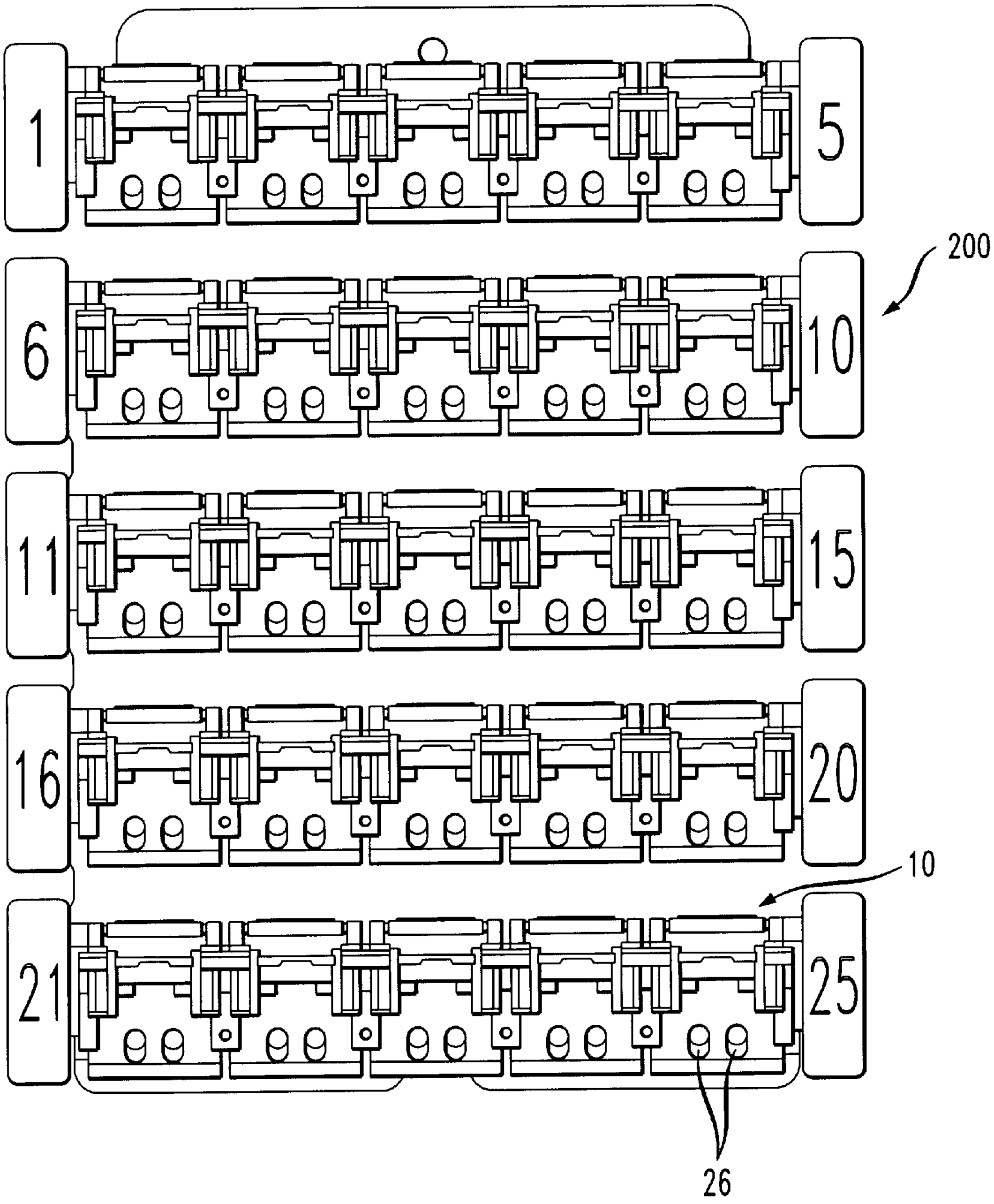
FIG. 3 is a top view of the terminal block of FIG. 2.
Figure 4:
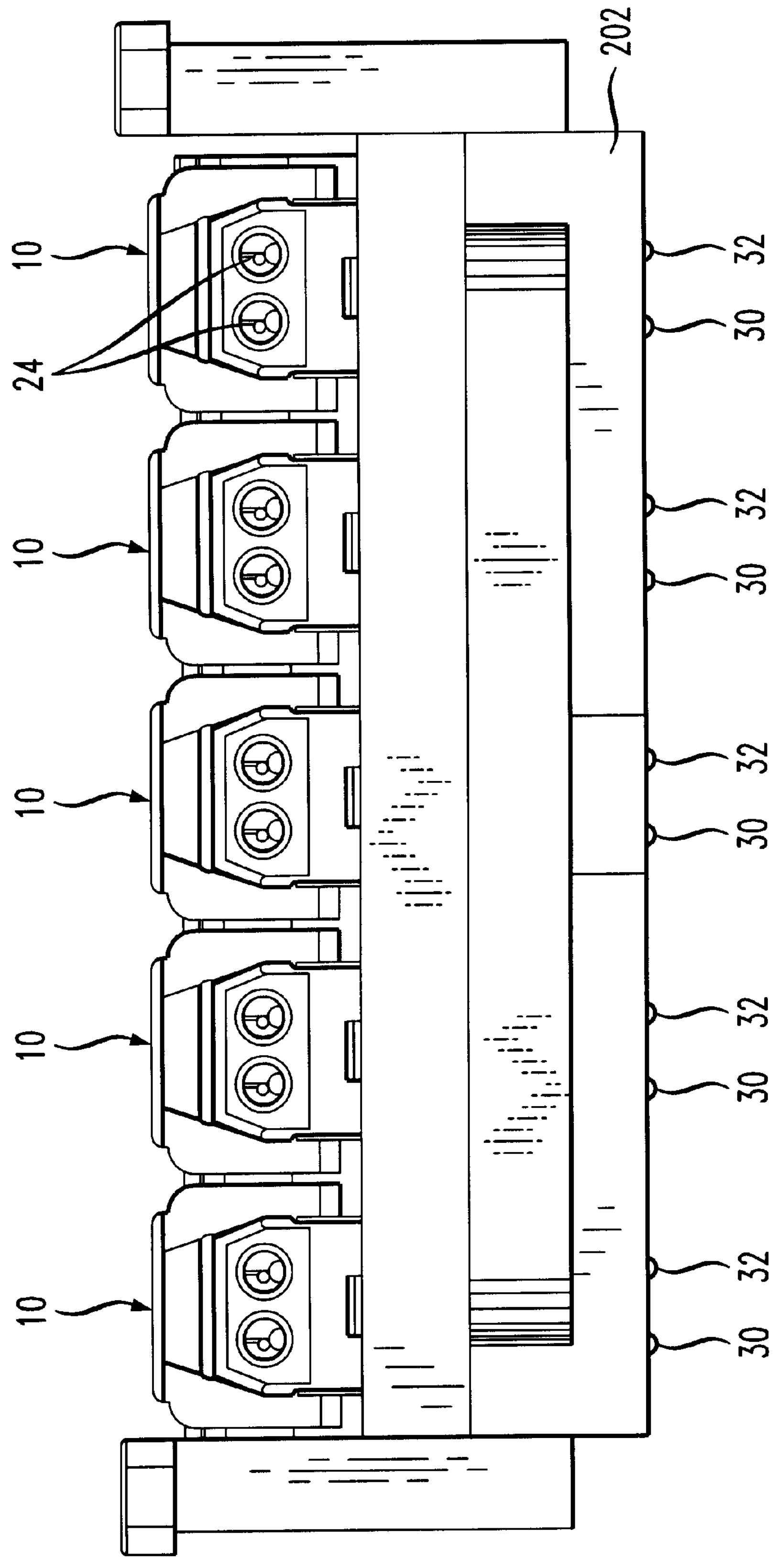
FIG. 4 is an end view of the terminal block of FIG. 2.

Two wire channels 22 are defined through the cap 20, each providing a path through which a wire may be passed. The following discussion is directed to one wire channel 22 of the inventive IDC 10, it being obvious to persons skilled in the art and from the disclosure provided herein that such discussion applies equally to both wire channels 22, unless expressly stated to the contrary. The wire channel 22 has two substantially straight sections 23, 27 connected by a transition section 25. The two substantially straight sections 23, 27 are preferably disposed at an obtuse angle with respect to each other. In a preferred embodiment, straight section 23 is longer than straight section 27. An insertion opening 24 having a tapered section 21 is defined at an end of the wire channel 22 and preferably at an end of straight section 23. As can be seen in FIG. 4, insertion opening 24 may have a generally circular shape, although other shapes may also provided, as a routine matter of design choice. An exit opening 26 is defined at an end of the wire channel 22 opposite of the insertion opening 24, and preferably at an end of straight section 27. As can be seen in FIG. 3, exit opening 26 preferably has a non-circular shape and has a generally expanding diameter when moving from the transition section 25 toward the exit opening 26 (see, e.g., FIG. 1).

Two channels 34, 36 are defined through the cap 20 in a direction generally transverse to and intercepting the two wire channels 22. The channels 34, 36 are sized and shaped so that they pass freely over and around a terminal 30, 32 provided in the base 40 (preferably, fixedly provided in the base 40) when the cap 20 is caused to pivot into and out of engagement with the body 40, as discussed in more detail below. With a wire placed in the wire channel 22, and with the cap 20 positioned as shown in FIG. 1, the cutting and connecting feature of the terminal 30, 32 will cut through the insulation of the wire and establish a physical contact with the conductor of the wire when the cap 20 is moved from the position of FIG. 1 to the position shown in the bottom of FIG. 5. The terminal 30, 32 thus displaces the insulation of the wire without the need for other tools (e.g., splice tools, wire cutters, etc.), and thereafter physically contacts the conductor.

Although FIG. 1 depicts a customer bridge 100 having only one IDC 10, more IDCs 10 constructed in accordance with the present invention may also be provided as part of the customer bridge 100, as a routine matter of design choice.

An exemplary operation of the inventive IDC 10 will now be discussed with continued reference to FIG. 1 and with additional reference to FIG. 5. IDC 10 is typically used to provide a connection between a first electronic device or system (not shown) and second electronic device or system via the telephone wire pair 80. The terms electronic device and electronic system are used herein in an exemplary fashion and are intended to refer generally to any type of electronic hardware that may be connectable to any other type (or to the same type) of electronic hardware via virtually any interconnection method and using virtually any interconnection equipment and hardware. A wire 70 (see, e.g., FIG. 5) may be inserted in the IDC 10 via the insertion opening 22. As the wire 70 is inserted, the tapered section 21 directs the wire 70 into the wire channel 22 and into straight section 23. If the wire 70 is intended to connect to a single IDC 10, as depicted in FIG. 1, the wire 70 is not caused to exit the wire channel 22, but preferably inserted until a leading end of the wire encounters the transition section 25. Once the wire 70 is positioned in the wire channel 22, the cap 20 may be caused to pivot from the position depicted in top of FIG. 5 to the position depicted in the bottom of FIG. 5. With the cap 20 in that position (e.g., the bottom of FIG. 5), terminal 30 is in physical contact with the conductor of the wire 70. While a single wire 70 has previously been discussed, the inventive IDC 10 has two wire channels 22 and can thus simultaneously accommodate two wires, with the forgoing description applying equally to both wires.

Figure 5:
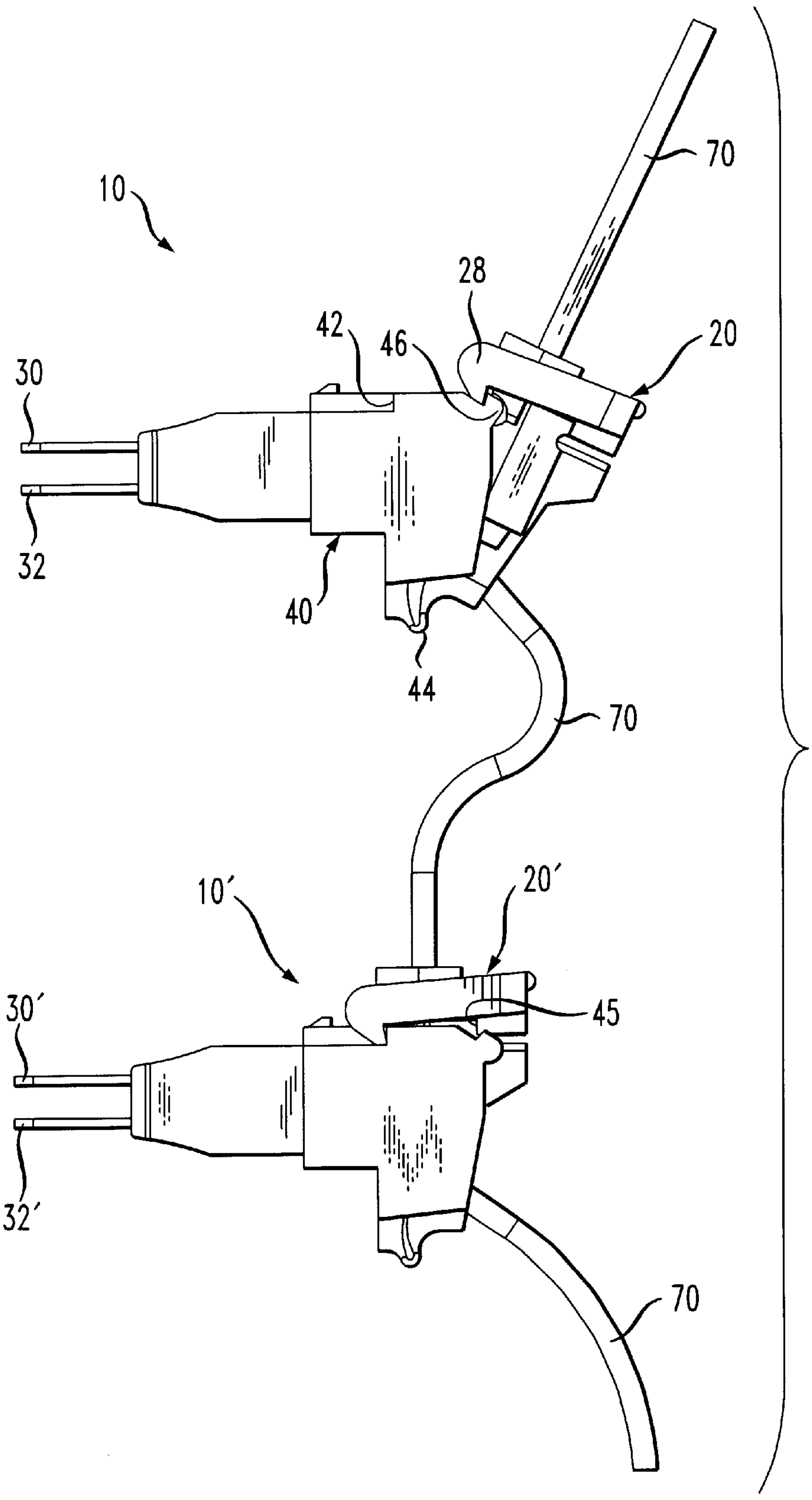
FIG. 5 is a side view of two insulation displacement connectors constructed in accordance with an embodiment of the present invention and connected together.

In FIG. 5, the cap 20 of the IDC 10 depicted in the top of the figure is positioned out of engagement with the base 40, or in a generally open position. In that position, the terminals 30, 32 do not intersect the wire channel 22 (see, e.g., FIG. 1), and an insulated wire 70 may be freely inserted into the wire channel 22. The cap 20 may be selectively pivotable between the positions depicted in the top and bottom of FIG. 5 (i.e., between an open and a closed position, respectively). To secure the cap 20 in either of the open or closed position, a latch 28 on the cap 20 has a latch surface 46 that engages a first latch surface 45 on the base 40 when the cap 20 is in the open position (top of FIG. 5), and that engages a second latch surface 42 on the base 40 when the cap 20 is in the closed position (bottom of FIG. 5). The latch 28 is selectively deflectable so that the latch surface 46 may be disengaged from the second latch surface 42, and the cap 20 selectively pivoted from the closed position to the open position.

In the embodiment depicted in FIG. 5, a plurality of IDCs 10 constructed in accordance with the present invention may be connected together (i.e., daisy-chained). For that embodiment, a wire 70 inserted into the wire channel 22 of a first IDC 10 passes through that wire channel 22 and onto a second IDC 10' and into the wire channel 22 of that IDC 10'. The exit opening 26 of the wire channel 22 enables such connections, which are not available with prior art IDCs. It will be obvious to persons skilled in that art that more than two IDCs 10 may be daisy-chained, and that FIG. 5 depicts an illustrative, non-limiting embodiment of one application of the IDC 10 of the present invention.

Figure 2:
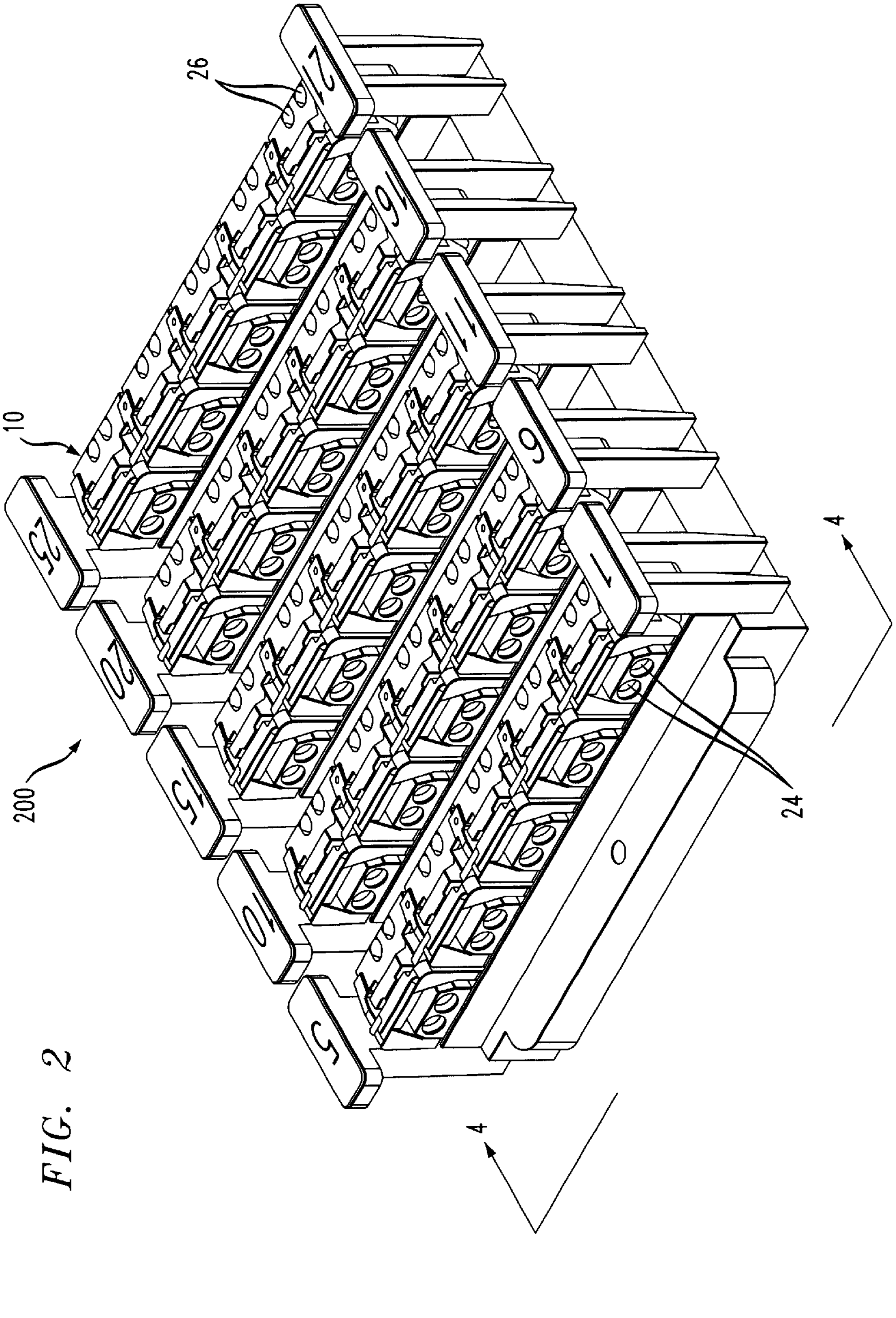
FIG. 2 is a perspective view of a terminal block having a plurality of insulation displacement connectors constructed in accordance with an embodiment of the present invention.

Referring next to FIGS. 2–4, a plurality of IDCs 10 constructed in accordance with the present invention are depicted inserted in a terminal block 200. The terminal block 200 provides the structure for arranging and holding a plurality of IDCs 10 so that a plurality of connections may be made at a convenient location in the Central Office, communications equipment closet, or wherever the terminal block 200 is installed. The terminal block 200 includes a base 202 having a plurality of apertures defined therethrough (not shown) that are sized and shaped to permit a terminal 30, 32 of an IDC 10 to freely pass therethrough. With the IDC 10 in place in the terminal block 200, as depicted in FIG. 2, for example, a wire may be connected to each terminal 30, 32, similar to the connection to those terminals described in connection with FIG. 1. The other features and advantages provided by the inventive IDC 10, as described above in detail with reference to FIGS. 1 and 5, are also provided in the IDCs 10 provided in the terminal block of FIGS. 2–4, and thus need not be described in detail again.

While the various embodiments of the present invention have been described herein referring to an insertion opening and an exit opening of the wire channel, such terms are not intended to limit or otherwise define the scope or spirit of the present invention. A wire may be inserted into either end of the wire channel, as a routine matter of design choice. In addition, the material from which the inventive IDC 10 is constructed is a routine matter of design choice, as is the gauge of the wire that may be used in connection with the IDC 10. Consequently, the dimensions of the wire channel 22, insertion opening 24, transition part 25, and exit opening 26, are all matters of design choice, and do not limit the scope and spirit of the present invention.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. An insulation displacement connector comprising:

a body; and a cap connected to said body for selective pivotable movement between a first position and a second position, said cap having a first wire channel defined therethrough, said first wire channel having a first end having an insertion opening defined thereat and a second end at an exit surface opposite said body having an exit opening defined thereat so as to provide separate ingress and egress locations for said first wire channel, wherein the first wire channel has a first section adjacent the first end and a second section adjacent the second end, the first and second sections disposed at an obtuse angle with respect to each other.

2. An insulation displacement connector as recited by claim 1, further comprising a second wire channel defined through said body, said second wire channel having a first end having an insertion opening defined thereat and a second end having an exit opening at an exit surface opposite said body defined thereat so as to provide separate ingress and egress locations for said second wire channel.

3. An insulation displacement connector as recited by claim 1, wherein said first wire channel expands toward said exit opening on the exit surface opposite said body.

4. An insulation displacement connector as recited by claim 1, wherein said exit opening of said first wire channel is non-circular.

5. An insulation displacement connector as recited by claim 2, wherein said first and second wire channels expand toward said respective exit openings on the exit surface opposite said body.

6. An insulation displacement connector as recited by claim 2, wherein said exit opening of each of said first and said second wire channel is non-circular.

7. An insulation displacement connector as recited by claim 1, further comprising:

a base having a first terminal therein, said exit surface being positioned opposite from said base; and a first channel defined in said cap and oriented transverse to and intersecting said first wire channel;

said first channel passing freely over and about said first terminal when said cap is moved between said first and said second positions.

8. An insulation displacement connector as recited by claim 2, further comprising:

a base having a first terminal therein, said exit surface being positioned opposite from said base;

a second terminal in said base;

a first channel defined in said cap and oriented transverse to and intersecting said first wire channel;

a second channel defined in said cap and oriented transverse to and intersecting said second wire channel;

said first channel passing freely over and about said first terminal, and said second channel passing freely over and about said second terminal, when said cap is moved between said first and said second positions.

9. An insulation displacement connector system comprising:

a first insulation displacement connector comprising:

a body; and a cap connected to said body for selective pivotable movement between a first position and a second position, said cap having a first wire channel defined therethrough, said first wire channel having a first end having an insertion opening defined thereat and a second end having an exit opening at an exit surface opposite said body defined thereat so as to provide separate ingress and egress locations for said first wire channel, wherein the first wire channel has a first section adjacent the first end and a second section adjacent the second end, the first and second sections disposed at an obtuse angle with respect to each other; and a second insulation displacement connector comprising:

a body; and a cap connected to said body for selective pivotable movement between a first position and a second position, said cap having a first wire channel defined therethrough, said first wire channel having a first end having an insertion opening defined thereat and a second end having an exit opening at an exit surface opposite said body defined thereat so as to provide separate ingress and egress locations for said first wire channel;

said first and said second insulation displacement connectors being positioned with respect to each other such that a wire may pass through said first wire channel of said first insulation displacement connector and through said first wire channel of said second insulation displacement connector.

10. An insulation displacement connector system as recited by claim 9, wherein said first insulation displacement connector further comprises a second wire channel defined through said body, said second wire channel having a first end having an insertion opening defined thereat and a second end having an exit opening at an exit surface opposite said body defined thereat so as to provide separate ingress and egress locations for said second wire channel, and wherein said second insulation displacement connector further comprises a second wire channel defined through said body, said second wire channel having a first end having an insertion opening defined thereat and a second end having an exit opening at an exit surface opposite said body defined thereat so as to provide separate ingress and egress locations for said second wire channel.

11. An insulation displacement connector system as recited by claim 9, wherein said first and second wire channels expand toward said respective exit openings on the exit surface opposite said body.

12. An insulation displacement connector system as recited by claim 9, wherein said exit opening of said first wire channel of each of said first and said second insulation displacement connector is non-circular.

13. An insulation displacement connector system as recited by claim 10, wherein said first and second wire channels expand toward said respective exit openings on the exit surface opposite said body.

14. An insulation displacement connector system as recited by claim 10, wherein said exit opening of said second wire channel of each of said first and said second insulation displacement connector is non-circular.

15. An insulation displacement connector system as recited by claim 9, wherein said first insulation displacement connector further comprises:

a base having a first terminal therein, said exit surface being positioned opposite from said base; and a first channel defined in said cap and oriented transverse to and intersecting said first wire channel;

said first channel passing freely over and about said first terminal when said cap is moved between said first and said second positions; and wherein said second insulation displacement connector further comprises:

a base having a first terminal therein, said exit surface being positioned opposite from said base; and a first channel defined in said cap and oriented transverse to and intersecting said first wire channel;

said first channel passing freely over and about said first terminal when said cap is moved between said first and said second positions.

16. An insulation displacement connector system as recited by claim 10, wherein said first insulation displacement connector further comprises:

a base having a first terminal therein, said exit surface being positioned opposite from said base;

a second terminal in said base;

a first channel defined in said cap and oriented transverse to and intersecting said first wire channel;

a second channel defined in said cap and oriented transverse to and intersecting said second wire channel;

said first channel passing freely over and about said first terminal, and said second channel passing freely over and about said second terminal, when said cap is moved between said first and said second positions; and wherein said second insulation displacement connector further comprises:

a base having a first terminal therein, said exit surface being positioned opposite from said base;

a second terminal in said base;

a first channel defined in said cap and oriented transverse to and intersecting said first wire channel;

a second channel defined in said cap and oriented transverse to and intersecting said second wire channel;

said first channel passing freely over and about said first terminal, and said second channel passing freely over and about said second terminal, when said cap is moved between said first and said second positions.

17. The insulation displacement connector of claim 2, wherein:

the second wire channel has a first section adjacent the first end thereof and a second section adjacent the second end thereof, the first and second sections of the second wire channel disposed at an obtuse angle with respect to each other.

18. The Insulation Displacement Connector of claim 1, wherein the connector has a base, the body extends above the base, the cap is above the body, and the exit surface is a top surface of the cap.

* * * * *